Aug. 12, 1958  A. BELLOMO ET AL  2,846,858
UNIVERSAL JOINTS

Filed July 17, 1956  2 Sheets-Sheet 1

INVENTORS
ANDREA BELLOMO
JEROME BERNARD CLIFFORD DUMONT
BY
Hane and Nydick
ATTORNEYS Aug. 12, 1958 A. BELLOMO ET AL 2,846,858
UNIVERSAL JOINTS
Filed July 17, 1956 2 Sheets-Sheet 2

INVENTORS
ANDREA BELLOMO
JEROME BERNARD CLIFFORD DUMONT
BY Hane and Nydick
ATTORNEYS

United States Patent Office 2,846,858
Patented Aug. 12, 1958

2,846,858

UNIVERSAL JOINTS

Andrea Bellomo, Turin, Italy, and Jerome Bernard Clifford Du Mont, London, England Application July 17, 1956, Serial No. 598,401

8 Claims. (Cl. 64—21)

This invention is concerned with improvements in or relating to universal joints.

In co-pending United Kingdom patent application No. 28332/54 there is described a universal joint in which one member comprises a pair of spaced plates parallel with the axis of that member and in which the other member comprises a single plate extending into the space between those parallel plates, two balls on either side of the centre plate being provided to transmit drive from one member to the other and each ball engaging a race in the opposed faces of the plates between which the ball lies, the races intersecting one another symmetrically in the plane containing the centre about which the members are angularly movable with respect to one another and bisecting the angle between the axes of the two members.

According to the present invention there is provided a universal joint comprising two members, one member having a pair of spaced plates parallel to the axis of that member and the other member having a single plate extending into the space between the spaced plates, a pair of abutment members being provided on either side of the central plate, each abutment member comprising a pair of part cylindrical pads each having a flat surface abutting the flat surface of the other pad, and each engaging a race which intersects symmetrically the race engaged by the other pad in the plane which bisects the angle between the axes of the members and which includes the centre about which the members are angularly movable with respect to one another.

According to a further feature of the present invention there is provided a load carrying member for a universal joint comprising a pair of part cylindrical pads each having a flat surface abutting the flat surface of the other pad, and means engaging each pad such that the pads are relatively rotatable about an axis normal to their flat surfaces.

Figure 1:
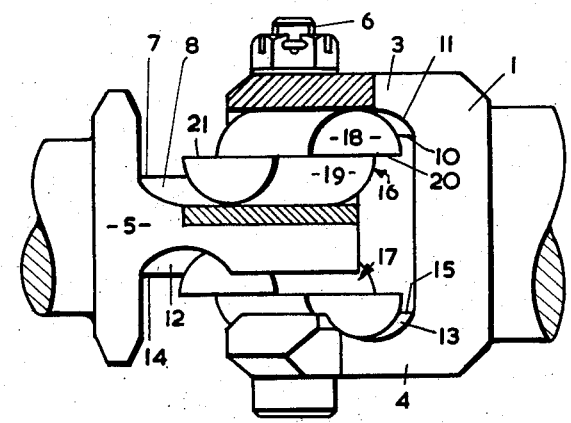
Figure 2:
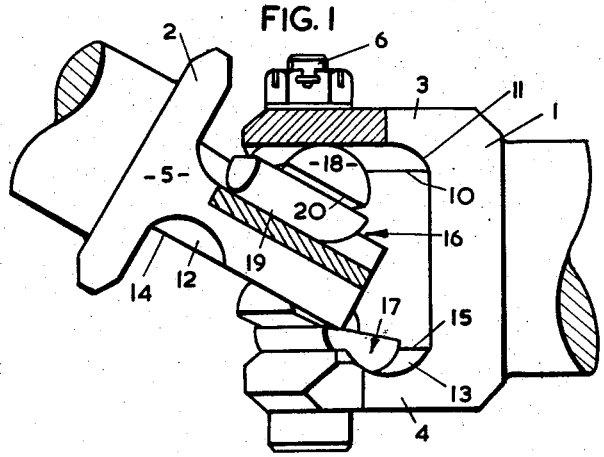
Figure 3:
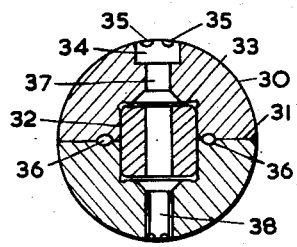
Figure 4:
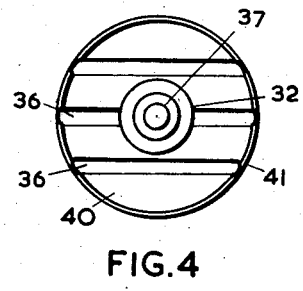
Figure 7:
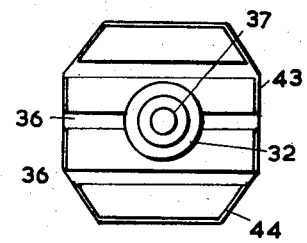
Figure 5:
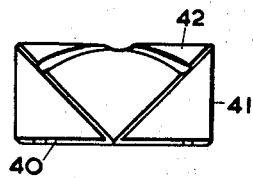
Figure 8:
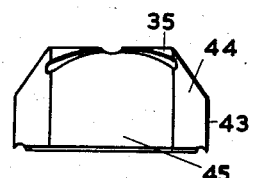
Figure 6:
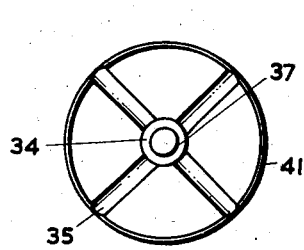
Figure 9:
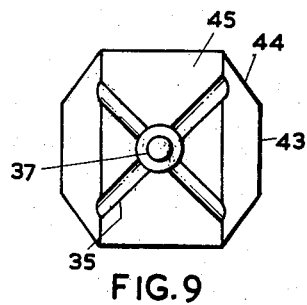

In order that the present invention may be well understood we will now describe some embodiments, given by way of example only, reference being had to the accompanying drawings in which, Figure 1 is a plan, partly in section of a universal joint with the axes of the driving and driven members aligned, Figure 2 is a plan, partly in section of the joint of Figure 1 with the axes of the driving and driven members angularly displaced, Figure 3 is a cross section of an abutment member, Figure 4 is underneath view of another embodiment of the upper pad of Figure 3, Figure 5 is an elevation of the pad of Figure 4, Figure 6 is a plan view of the pad of Figure 4, Figure 7 is an underneath view of another embodiment of the upper pad of Figure 3, and Figures 8 and 9 are respectively an elevation and a plan view of the pad of Figure 7.

The universal joint illustrated comprises two members 1 and 2. Two parallel plates 3, 4 project from member 1, while a plate 5 projects from the member 2, which plate 5, when the members are axially aligned, is parallel with the plates 3, 4.

The members 1, 2 are coupled together by any suitable means to permit rotation of the members about their axes whether the axes are aligned or angularly displaced.

Such means may comprise a bolt 6 which passes through each of the plates and carries freely a spherically surfaced roller which engages a recess or slot having a spherical surface in the centre plate. The bolt may have a tapered end and be held against rotation by engagement between its head and a machined flat on the plate 4.

In the face 7 of the plate 5 is a race 8 and in the face 10 of the plate 3 is a race 11. Similarly in the face 14 of the plate 5 is a race 12 while in the face 15 of the plate 4 is a race 13.

The races 8, 10 are in planes parallel with their respective plates and each is inclined with respect to the axis of its member so that they intersect symmetrically in the plane which includes the point of intersection of the axes of the members 1, 2 and which bisects the angle between those axes. In Figure 1 that plane is normal to the axes of both members and includes the axis of bolt 6. In Figure 1 the race 8 to the left of such plane is a mirror image of race 10 to the right of that plane.

The races 12, 13 are similarly disposed and corresponding pairs of races are disposed one pair on each side of the plate 5 below the bolt 6. The races on the plate 5 below the bolt 6 being mirror images of the races 8, 12 and the races on plate 3, 4 being mirror images of the races 11, 13 respectively with respect to the plane including the axis of bolt 6 and the axes of the members 1, 2 when aligned. Engaging each pair of races is an abutment member, such as 16, 17; the abutment members are identical and one only, 16 will be described.

The abutment member 16 comprises two pads 18, 19 each part cylindrical, each movable along its race, each movable about its longitudinal centre line in its race, and each having a flat face 20, 21 the flat faces abutting. The pads 18, 19 are locked together but are rotatable with respect to one another about an axis which is normal to their flat faces and which intersects the longitudinal centre line of each. The point of intersection of the axis about which the pads are relatively rotatable and the flat faces, lies in the plane which includes the intersection of the axes of members 1, 2 and the intersection of the races 8, 10. When the members 1, 2 move to the position shown in Figure 2 from that shown in Figure 1 both pads move about their longitudinal centre lines and both move along their races.

The pads of an abutment member may be coupled together in any suitable manner but at present we prefer to couple them by means of a bush having a central throughway and to provide in each pad a throughway which is aligned with the throughway in the bush. Oil grooves may be provided in the bearing surfaces of each pad.

Referring to Figure 3 there is shown a pair of coupled pads rotated so that their longitudinal axes are aligned. These pads each having a cylindrical surface 30, a flat surface 31 and a central recess 32, for receiving one end of a bush 33. The cylindrical surface 30 has oil grooves 35 while the flat surface has oil grooves 36. One pad has a recess 34 and bore 37 whilst the other has a threaded bore 38, whereby the pads may be coupled together by a threaded bolt.

The pads preferably are not rectangular at their flat faces but take the form shown in Figures 4 to 6 or 7 to 9. Thus the pads may, as shown in Figures 4 to 6 have a circular flat face 40, rounded ends 41 and a cylindrical bearing surface 42. Alternatively, as shown in Figures 7 to 9 each pad may have planar end faces 43, bevelled corners 44 and a cylindrical bearing surface 45.

It is to be understood that the coupling of the pads of a pair could be achieved by means of a ball engaging recesses in the flat faces or by a pin.

By provision of the pivotally interlocked pads the load is maintained centrally of the pads. Furthermore the load is spread on the pads giving more efficient operation than where line contact load carrying members are used. In addition the axis about which each pair of pads pivots lies in the line of action of the load.

We claim:

1. A universal joint comprising, in combination, a pair of drive members, one of said drive members comprising a pair of spaced parallel plates symmetrically arranged with respect to and parallel to the axis of rotation of said one drive member, the other of said drive members including a single central plate extending into the space between said pair of spaced plates and being parallel to and equally spaced from each of said spaced plates, and an abutment member being disposed between each one of said pair of said spaced plates and said central plate, the adjacent sides of each of said pair of plates and said central plate defining individual races having longitudinal axes intersecting with each other in a plane bisecting the angle between said drive members and which includes the center about which said axes of rotation are angularly movable with respect to one another, each abutment member including a pair of part cylindrical pads each having a flat surface abutting the flat surface of the other pad and each disposed within one of said races, said pads being coupled together for relative rotation about an axis normal to said flat surfaces.

2. A universal joint comprising, in combination, first and second joint members, abutment members interposed between said joint members, each of said abutment members comprising a pair of part cylindrical pads, each one having a flat surface abutting the flat surface of the other pad, said pads being coupled together for relative rotation about an axis normal to said flat surfaces, said first joint member including a pair of spaced plates parallel to each other and parallel to the longitudinal axis of rotation of said joint member, said second joint member comprising a single plate parallel to and lying in a plane containing a longitudinal axis of rotation of said second joint member, said single plate extending into the space between said spaced plates and the opposite faces of said single plate each having straight races, the longitudinal axes of said races intersecting in a plane bisecting the angle between the longitudinal axes of said joint members and including the point of intersection of said joint axes, a pair of said pads being disposed within the space between each of said spaced plates and said single plate with each one of said pair of pads engaging one of said races of said spaced and said single plates.

3. A load carrying member for universal joints comprising, in combination, a pair of part cylindrical pads, each one of said pair of pads having a flat surface, said pair of pads being supported with said flat surface of one pad in engagement with the flat surface of the other pad, and said pads being pivotally interlocked for rotation about an axis normal to said flat surfaces.

4. A universal joint according to claim 2 in which the part cylindrical pads are coupled by means of a bush engaging a recess in each of the flat faces.

5. A universal joint according to claim 4 in which one of each pair of said pads of each abutment member has a passage therethrough for receiving a connecting member.

6. A universal joint according to claim 5 in which each pad has rounded ends.

7. A universal joint according to claim 6 in which the pads have lubricating channels in their bearing surfaces.

8. A load carrying member for a universal joint comprising a pair of part cylindrical pads each one having a flat surface abutting the flat surface of the other pad, and pivotal interlocking means engaging each pad and extending into the flat surface of each pad such that the pads are relatively rotatable about an axis normal to their flat surfaces.

References Cited in the file of this patent

UNITED STATES PATENTS

| | | |
|---|---|---|
| 1,101,996 | Carter et al. | June 30, 1914 |
| 1,261,161 | Peters | Apr. 2, 1918 |
| 1,316,733 | McGee | Sept. 23, 1919 |
| 2,599,596 | Wildhaber | June 10, 1952 |